April 6, 1937. M. L. DAVIS 2,076,069
VEHICLE WHEEL RAISING DEVICE
Filed Aug. 26, 1935
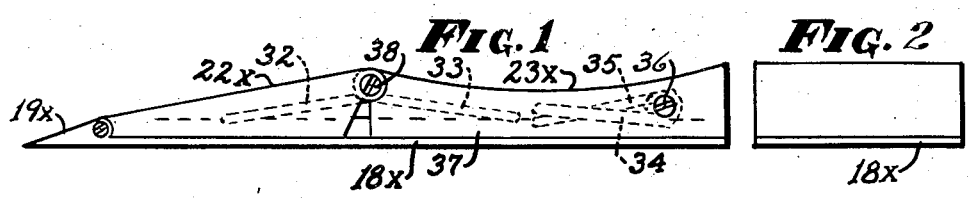
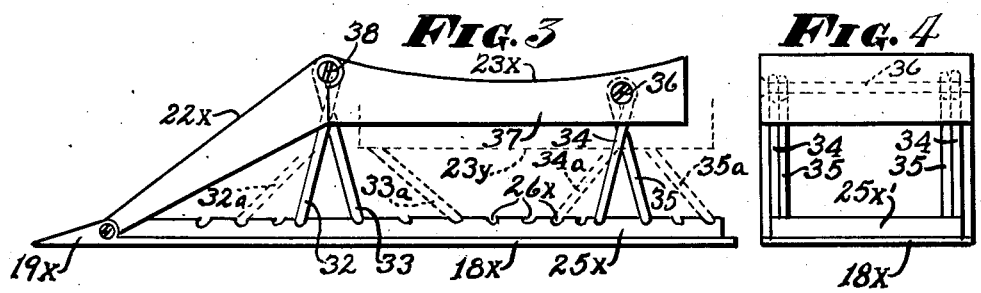
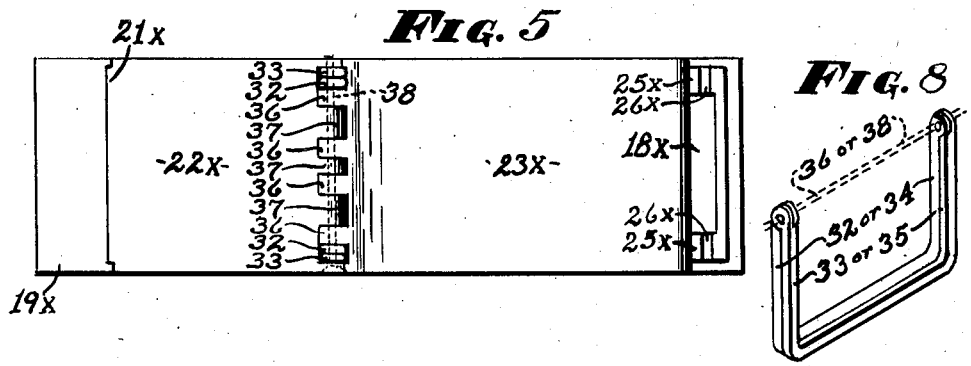
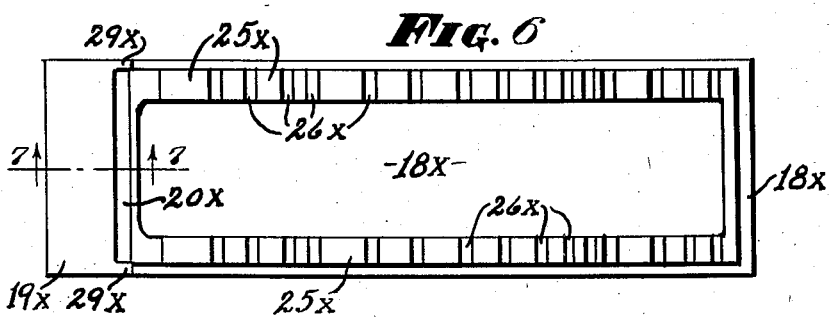
INVENTOR.
Melvin L. Davis
BY William C. Edwards Jr.
ATTORNEY Patented Apr. 6, 1937

2,076,069

UNITED STATES PATENT OFFICE 2,076,069

VEHICLE WHEEL RAISING DEVICE

Melvin L. Davis, Wichita, Kans.

Application August 26, 1935, Serial No. 37,810

3 Claims. (Cl. 254—88)

My invention relates to an improvement in vehicle wheel raising devices.

Manufacturers of automobiles have been striving to make automobile riding easy by using tires having a large cross sectional area which requires a small wheel in order to keep from making the diameter of the tire too large.

Motorists have found that due to this condition, a tire which has become punctured will drop the axle of the car so low that it is impossible to get a jack under the axle so that the wheel may be lifted to such a point that the tire may be removed from the wheel.

In view of this trouble I have made a wheel raising device which may be placed in front of, or behind a wheel having the deflated tire so that the car may be driven to roll the wheel on top of the device and thereby raise the axle carrying the wheel to such a point that a jack may be easily placed under the axle and the axle be raised still higher so that the wheel raising device may be removed from under the wheel.

A further object of my device is to provide a device of the kind mentioned, the height of which is adjustable to provide for various sizes of tires and also to minimize the amount of raising the jack will have to do.

A still further object is to provide a device of the kind mentioned which will fold up so that it may be easily carried under the rear seat of a car, or in other limited spaces.

Another object is to provide a device that may be used to block a wheel to prevent it from rolling; this is useful in cases where a car is parked in an inclined place and it may be desirable to block the wheels so that the car will not roll down hill.

These and other objects will be more fully explained as this description progresses.

Referring to the accompanying drawing;

Fig. 1 is a side view of the device. This view shows the device in its collapsed or folded position.

Fig. 2 is a rear end view of Fig. 1.

Fig. 3 is a side view of the device shown in Fig. 1, except that the device is shown in its raised position.

Fig. 4 is a rear end view of Fig. 3.

Fig. 5 is a plan view of Fig. 3.

Fig. 6 is a plan view of the base plate of the device shown in Figures 1 to 5 inclusive.

Fig. 7 is a sectional view as seen from the line XVI—XVI in Fig. 6.

Fig. 8 is a perspective view of a modified form of the supporting elements employed in the device illustrated in Figs. 1, 3 and 4.

In the drawing, similar numerals of reference designate the same part throughout the several figures of the drawing.

In Figs. 1 to 6 inclusive is shown my wheel raising device. The object of this design is to provide a device for the purposes above mentioned and also to provide a device in which the curved wheel carrying element 23x may be raised or lowered and still retain its horizontal position in all of its adjusted positions.

The device comprises a base element 18x, one edge of which is provided with a wedge shaped portion 19x in which is formed a socket 20x and at each end of the socket 20x is a flange element 29x through which is a hole 31 to receive screws which are threaded in the rib element 21x of the incline element 22x.

At 25x is an upwardly extending rib that is integral with the base element 18x. The upper face of the ribs 25x are provided with a series of notches 26x, to receive the lower ends of the bail like elements 32, 33, 34 and 35. The elements 34 and 35 are hingedly mounted on a bolt 36 which is carried in the flanges 37 on the sides of the curved element 23x. The plates 22x and 23x are provided with ear like elements 36 and 37 through which passes a bolt 38 to provide a hinge connection between the elements 22x and 23x. The upper ends of the bail like elements 32 and 33 are provided with an eye through which the bolt 38 also passes to form a pivotal mounting for the bail elements 32 and 33. It is obvious that the element 23x may be fixed in adjusted positions as illustrated by the dotted position 23y by positioning the bails 32—33, 34—35 to the dotted positions 32a—33a and 34a—35a, and when the device is not in use, the elements 22x and 23x may be lowered so that the flanges 37 will rest on the base element 18x as illustrated in Figs. 1 and 2.

As shown in Figs. 3 and 4, the legs of the bail element 33 are adapted to fit between the leg elements of the bail 32, likewise the legs of the bail elements 35 are adjusted to fit between the legs of the bail element 34 for folding purposes.

In Fig. 8 is shown a modification of the bail like elements abutting each other for the purpose of presenting a neater appearance.

Such modifications may be employed as lie within the scope of the appended claims without departing from the spirit and intention of the invention. Now having fully described my invention, what I claim as new and desire to secure by Letters Patent is;

1. In a vehicle wheel raising device of the kind described; a base element, a wheel supporting element, and an incline element, and means intermediate said base element and said wheel supporting element for supporting said wheel supporting element in adjusted elevated positions above said base element; one end of said incline element being hingedly connected to said wheel supporting element, the other end of said incline element terminating in a journal formation; said base element having a wedge shape formation on one end thereof and a bearing formed in the base of said wedge; said journal being seated in said bearing and means for retaining said journal in said bearing.

2. In a vehicle wheel raising device; a base element, an incline element, a wheel supporting element and means for supporting said wheel supporting element in selected adjusted, elevated positions; one end of said incline element being hingedly attached to the wheel supporting element, the other end of said incline element terminating in an integrally formed journal formation; one end of said base element being formed in a wedge shape having a hollow bearing formation in the base thereof in which is rockably seated the journal portion of said incline element.

3. In a vehicle wheel raising device; a base element, a wheel supporting element, and an incline element, and supporting elements for said wheel supporting element; said base element having upwardly extending ribs thereon with adjustment notches in the upper faces thereof, said ribs terminating in a wedge element on one end of said base element, said wedge element having a hollow formation in the base with flange elements covering the ends thereof, said flange elements being provided with bolt holes; said incline element having a journal element formed on one end thereof and being rockably seated in said hollow portion of said wedge formation on the base element and means for maintaining said journal in said hollow formation, the other end of said incline element having hinge elements thereon; said wheel supporting element having a concave upper face portion with depending flanges around two sides and one end, the other end of said wheel supporting element having hinge elements thereon that fit between those on the incline element and a bolt passing through the hinge elements on both the incline element and wheel supporting element; a pair of paired bail like support elements, one pair of said bail like elements hinged to the structure in the hinge joint formed between the incline element and the wheel supporting element; the second paired bail like element being hingedly mounted at the rear of the wheel supporting element and between the flanges thereof, said bail like elements resting in the adjusting notches in the ribs on the base element to support the wheel supporting element in adjusted elevated positions.

MELVIN L. DAVIS.